Figure 4:
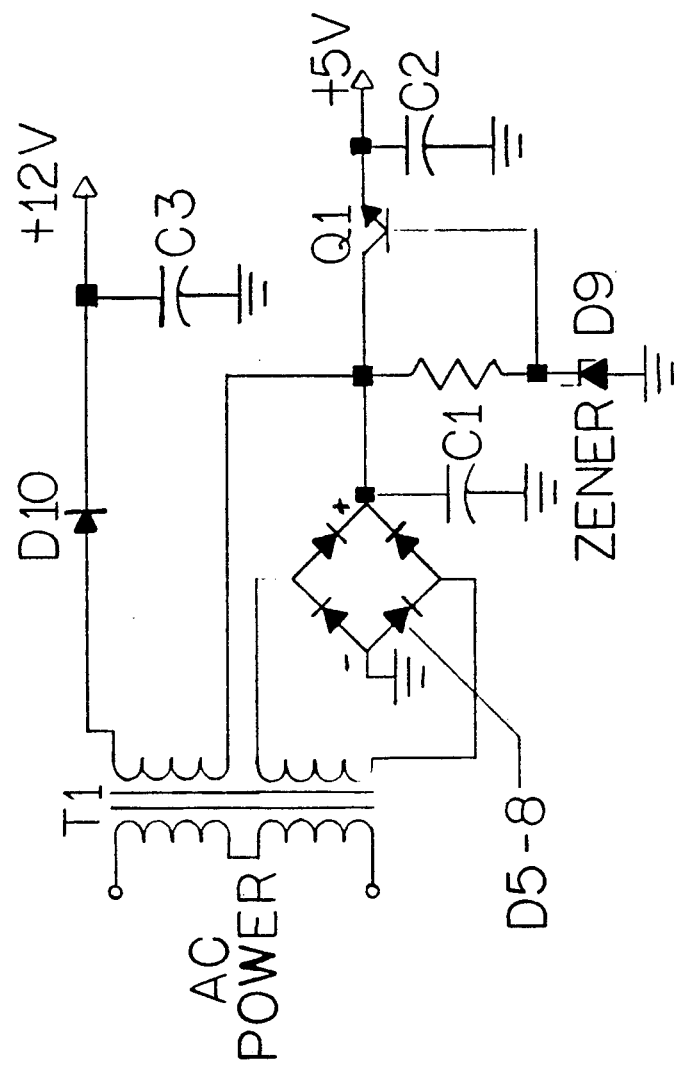

United States Patent [19]

Faraci, Jr.

[11] Patent Number: 5,270,684
[45] Date of Patent: Dec. 14, 1993

[54] OIL CONSUMPTION COUNTER

[76] Inventor: Vito Faraci, Jr., 3 Diane La., E. Northport, N.Y. 11731

[21] Appl. No.: 848,356

[22] Filed: Mar. 9, 1992

Related U.S. Application Data

[63] Continuation-in-part of Ser. No. 596,016, Oct. 11, 1990, abandoned.

[51] Int. Cl.⁵ .................. G08B 17/12; G01F 1/00; F23N 5/08
[52] U.S. Cl. ..................... 340/578; 73/861; 340/870.29; 377/21; 431/79
[58] Field of Search ............... 340/577-578, 340/605-607, 609, 611, 870.02, 870.16, 870.29; 73/112-114, 861, 198; 364/431.01, 510; 250/554; 431/79; 377/21; 123/198 R; 137/551

[56] References Cited

U.S. PATENT DOCUMENTS

| | | | |
|---|---|---|---|
| 4,012,948 | 3/1977 | Kuno et al. | 73/113 |
| 4,262,530 | 4/1981 | Gerquest | 73/861.8 |
| 4,530,247 | 7/1985 | Haas | 73/861 |
| 4,674,338 | 6/1987 | Carpenter | 73/861.77 |
| 4,706,496 | 10/1987 | Hicks | 73/268 |
| 4,774,676 | 9/1988 | Stenzel et al. | 364/510 |
| 4,821,580 | 4/1989 | Jorritsma | 73/861 |

Primary Examiner—John K. Peng
Assistant Examiner—Thomas J. Mullen, Jr.

[57] ABSTRACT

An improved electronic measuring system which not only determines the amount of fuel oil consumed by a home, office, or factory heating system, but also detects leaks in underground fuel storage tanks, errors in oil deliveries, heating system problems such as clogged nozzles, lines, filters, etc. and declining heating system efficiencies. The measuring system consists of an electromagnetic counter, printed circuit board with electronics, transformer, and dipswitches which are located in an enclosed housing. The device calculates fuel consumption rate via a mathematical algorithm based on burner nozzle size, fuel pump pressure, and burner flame-on time. Errors in count are avoided by using the burner's photo-optic cell output, and maintaining constant power to the electronics.

3 Claims, 7 Drawing Sheets

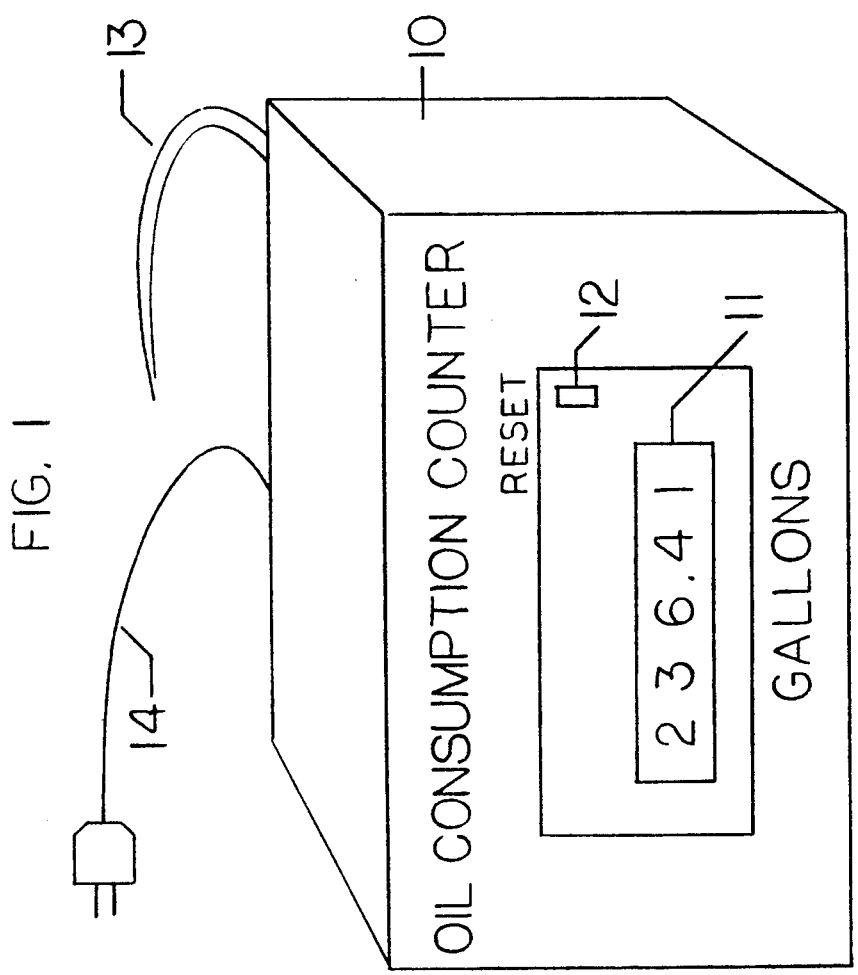

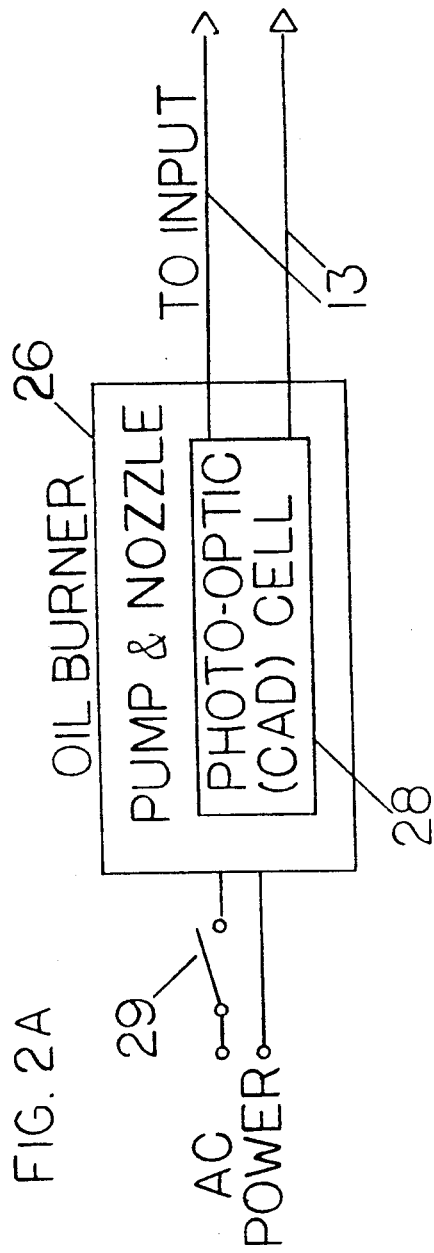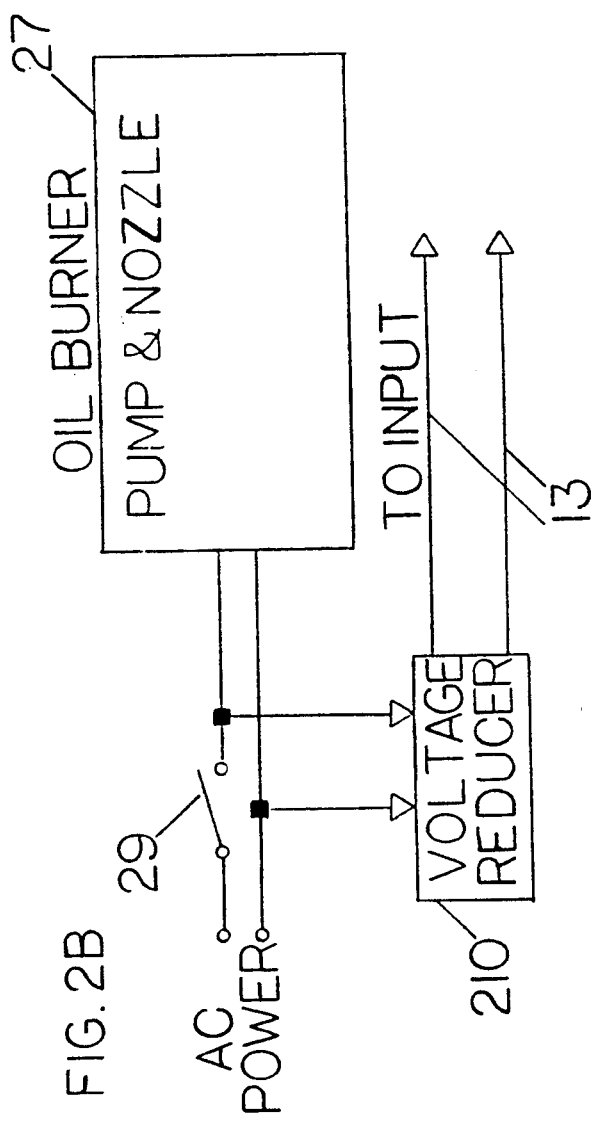

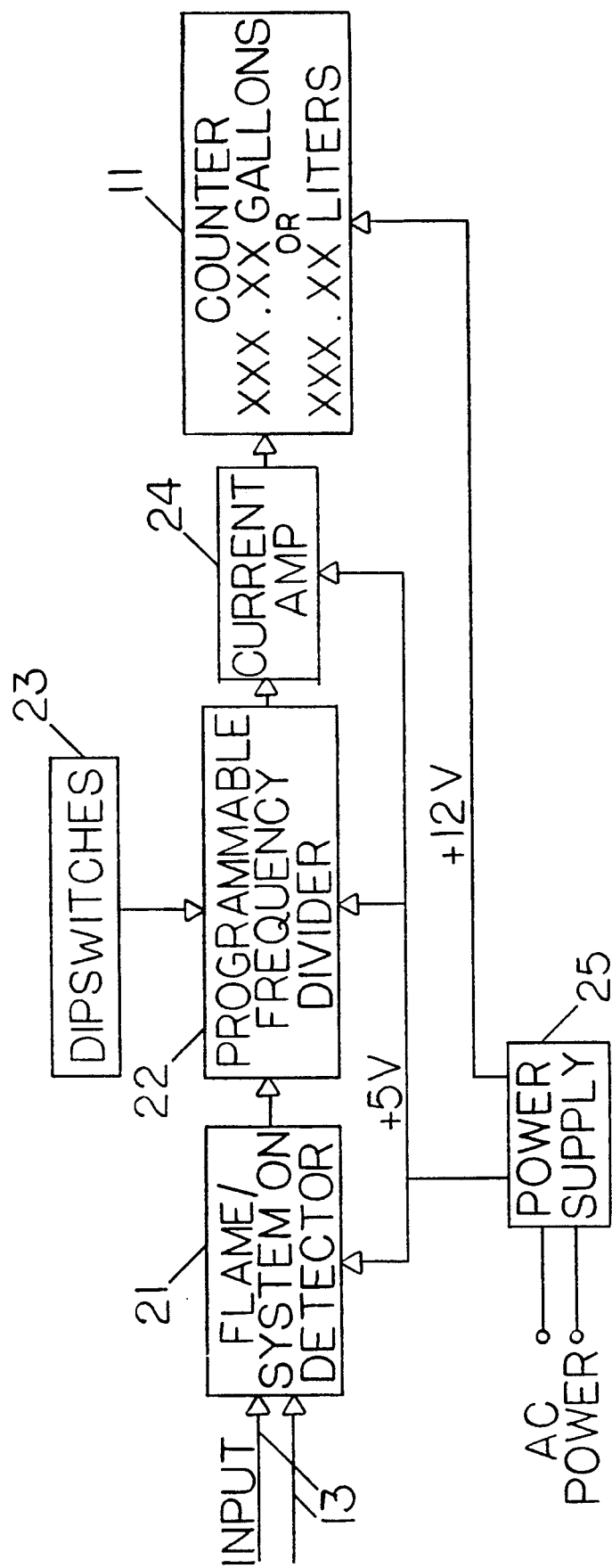

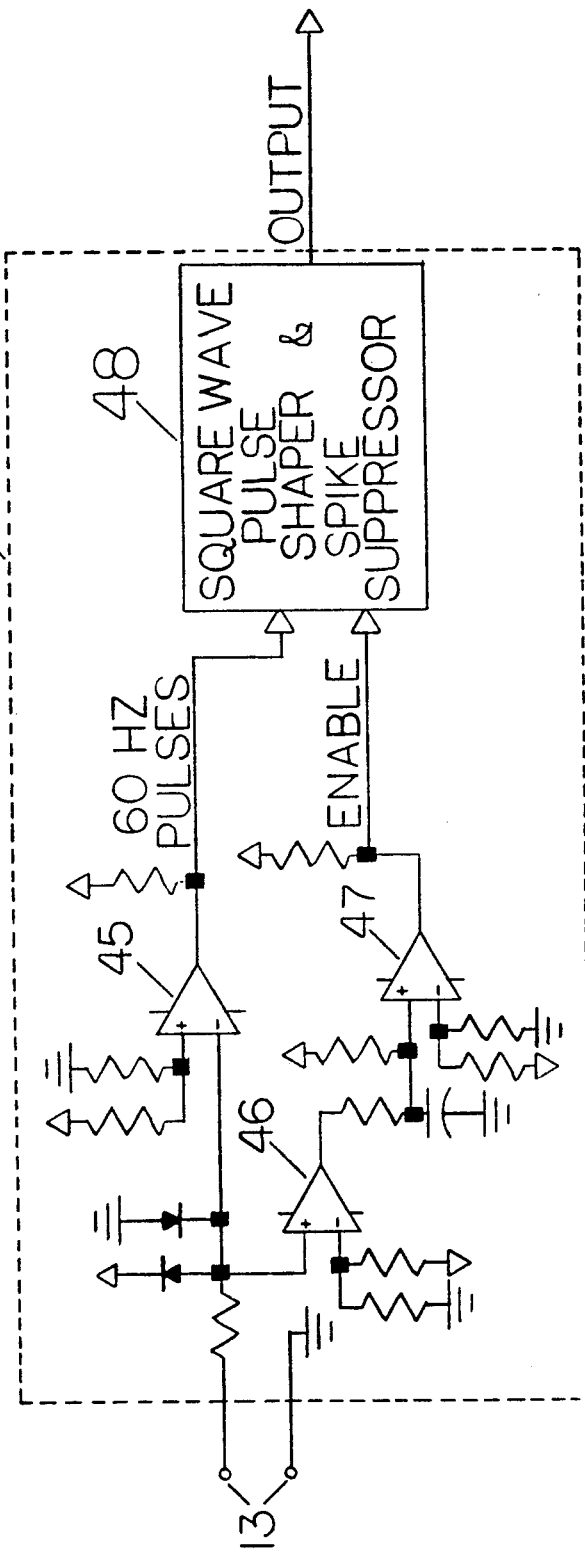

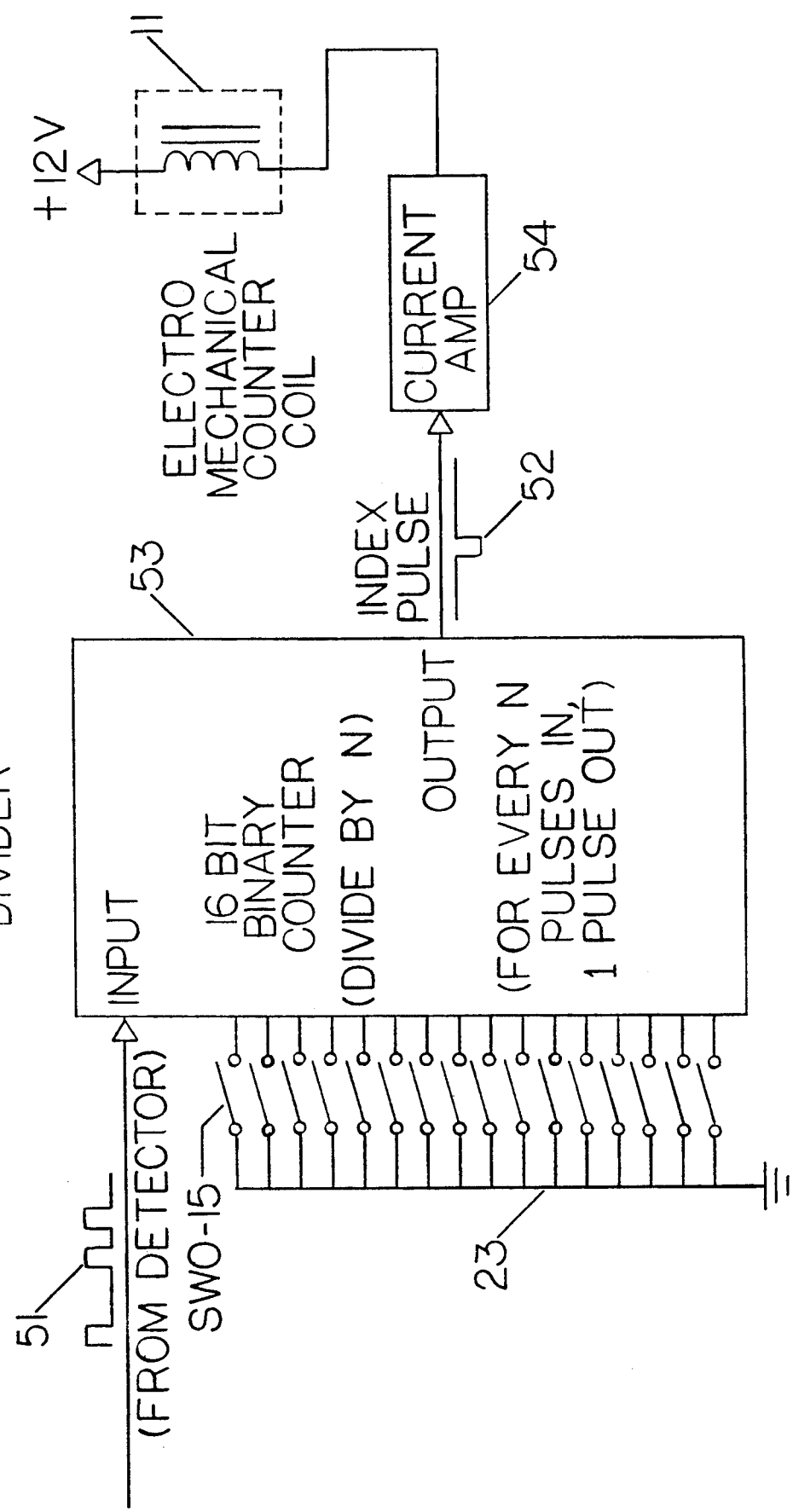

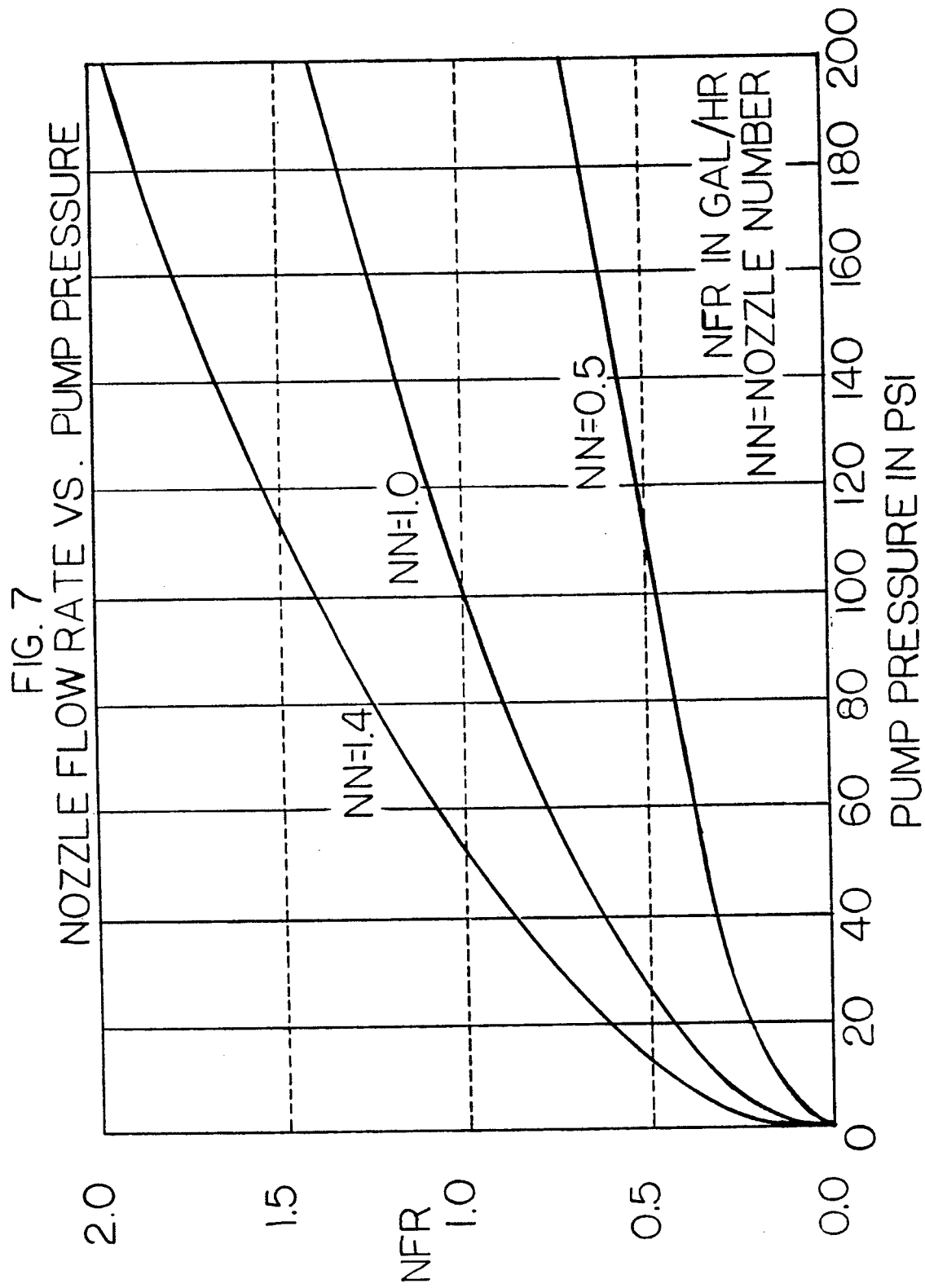

OIL CONSUMPTION COUNTER

This is a Continuation-In-Part of application Ser. No. 07/596,016, Oct. 11, 1990 which was abandoned.

BACKGROUND—FIELD OF THE INVENTION

This invention relates to fuel measuring systems. More specifically to an improved method of measuring fuel consumption utilizing a mathematical algorithm based on burner nozzle size, fuel pump pressure, and burner flame on-time.

BACKGROUND—DESCRIPTION OF PRIOR ART

The heating systems utilizing fuel storage tanks have limited means to accurately monitor consumption. Many oil heat users allow oil companies to track consumption, and fill their tank as required. This approach places most control in the hands of fuel distributors, and allows only after the fact, gross consumption visibility to the user. Although other tank reading methods place control in the hands of the consumer, they are often time consuming, have limited accuracy, and are sometimes inconvenient, especially for individuals with buried tanks who must go out in inclement weather to take a dipstick reading. In some underground installations, obstructions exist that prohibit the use of a dipstick entirely.

Typical measurement methods are:

Dipstick method. The disadvantages of this method are stated above.

Bubble or level indicators which utilize a buoyant material attached to a mechanical arm that registers the fluid level on a calibrated scale located on top of the tank. This approach has accuracy, limited to approximately plus or minus $\frac{1}{8}$ of a tank, and is restricted to indoor installations.

Liquid flow meters such as the venturi tube, orifice, pitot tube, elbow trap, and variable area meters measure fluid flow rate only, and have to be mechanically inserted into the pipe or tube carrying the fluid. Typically these devices range in accuracy from one to ten percent and introduce undesirable fluid flow restrictions.

Totalizers or electromechanical meters that can measure both fluid rate and amount (volume). These devices like the ones mentioned above must also be mechanically inserted and exhibit similar fluid flow restrictions. The cost of these devices are usually over $800.

A novel approach to measurement of fuel consumption which addresses some of the disadvantages of the above devices was proposed by Gerquest in U.S. Pat. No. 4,262,530 dated Apr. 21, 1981. The proposed invention's operating theory assumes oil burners consume at a constant rate, and if that rate is known, consumption can be determined by multiplying this rate by the total amount of elapsed time the burner is operating. Although the theory is sound, this prior art has three significant flaws which will result in measurement errors. They are:

1. Lack of provisions for oil delay valves in the proposed invention's operating theory or design. These devices delay the flow of oil for 2 to 15 seconds every time the system is activated, in order to allow the fuel pump to attain sufficient operating speed before the oil is released. This ensures that the fuel is properly atomized and will burn efficiently before being introduced into the firing chamber. On a cold day, in a poorly insulated house, an oil burner could be activated every 12 minutes, or 120 times per day. This equates to an elapsed delay time of 4 to 30 minutes, or an error of up to $\frac{1}{2}$ gallon consumption per day (based on a 1 gallon/hour nozzle rate).

2. Failure to compensate for different oil pump pressures. Gerquest in U.S. Pat. No. 4,262,530 dated Apr. 21, 1981 states that consumption equals nozzle rate times elapsed time-on, and that oil pressure variations are negligible, and have an insignificant effect on the accuracy of the metering system. The first part of the statement is correct, however the second is not. Nozzle rate (actual flow rate) is equal to the nozzle number (number stamped on nozzle) times the square root of pump pressure, all divided by ten. The nozzle number found stamped on an oil burner nozzle is the flow rate specified by the nozzle manufacturer based on a 100 psi pump pressure. When fuel pump pressures other than 100 psi are used, the above correction equation must be used to obtain actual flow rates. Therefore, contrary to the above prior art teaching, oil pressure variations do effect the accuracy of the metering system. Reference DELAVAN Oil Burner Nozzle Manufacturing Co. West Des Moines, Iowa. See FIG. 7.

3. Device slaved to burner system power resulting in counter measurement error. The prior art's design utilizes the same source of power to activate the counter as that of the burner. The Variable Rate Pulse Generator section of the electronics, inputs pulses at a rate of 60 per second, tabulates the time equivalent of 1/100 gallon consumption, and increments the electromechanical mechanical counter. Allowing the device's power source to deactivate simultaneously with the burner, causes this circuit to reset to an indeterminant time count. As a result, an error of up to 1/100 gallon is introduced every time the burner turns off. Assuming a 1 gal/hr nozzle rate, a measurement error of up to 1.2 gallons per day could occur in the hypothetical example used in 1.

In addition to stated disadvantages, all the aforementioned approaches limit oil consumption measurement to a close proximity of the fuel storage tank and/or burner.

OBJECTS AND ADVANTAGES

It is therefore the intention of the present invention to not only improve upon the accuracy of a fuel consumption measuring system, but also to provide the following objects and advantages:

(a) low cost;

(b) entirely extraneous to fuel burner and flow lines, and therefore simple, clean, and inexpensive to install; no pipes to cut and no problems with leaks;

(c) no moving parts implying high reliability;

(d) utilizes low voltage for count stimulus thus allowing bell wires to be easily run in order to position counter in any convenient location;

(i) detects a clogged or restricted fuel line to burner;

(j) detects an inefficiently running heating system;

(k) measures in gallons or liters;

(l) operates at 120/220 volts and 50 or 60 cycles;

(m) compensates for different oil pump pressures as well as nozzle sizes;

(n) detects leaks in underground storage tanks;

(o) high accuracy;

(p) very low energy consumption (less than 1 watt);

(q) is constantly powered to avoid measurement errors;

(r) utilizes burner's photo-optic cell to activate counting mechanism and thus avoiding false counts when fuel is not passing through pump during initial start-up;

(s) resettable to a given number (decremental count) for measuring fuel remaining in a tank, as well as resettable to zero (incremental count) for measuring consumption.

Further objects and advantages of this invention will become apparent from a consideration of the drawing and ensuing description of it.

DESCRIPTION OF DRAWING FIGURES

FIG. 1 Isometric view of oil Consumption Counter (OCC).

FIG. 2A Oil burner (utilizing cad cell) input to OCC.

FIG. 2B Oil burner (without cad cell) input to OCC.

FIG. 3 OCC block diagram.

FIG. 4 Power supply schematic showing how +5 volts is developed for electronics, and +12 volts for electromechanical counter.

FIG. 5 Block diagram of Flame/System-On Detector circuit.

FIG. 6 Block diagram of Programmable Frequency Divider driving electromechanical counter.

FIG. 7 Graph of nozzle flow rate versus fuel pump pressure illustrating three different nozzle sizes.

DESCRIPTION OF INVENTION

Refer to FIG. 1. The Oil Consumption Counter (OCC) is an electronic device enclosed in a metal cabinet 10 powered by 120 or 220 VAC 50/60 HZ via a power line cord 14. Mounted on the front of the cabinet 10 is an electromechanical counter 11 with 5 digit numeric display which reads 000.00 to 999.99 or 0000.0 to 9999.9 units. The counter 11 is reset to all zeros by depressing the reset button 12. The OCC receives its counting stimulus from two light gauge wires 13 which connect to an oil burner's cad (photo-optic) cell.

OPERATION OF INVENTION

Refer to FIG. 2 and 3. The OCC is made up of a flame/system-on detector 21, a programmable frequency divider 22, dipswitches 23, a current amplifier 24, the electromechanical counter 11, and a power supply 25. Oil burner fuel pump pressure and nozzle size information are input via the dipswitches 23 in binary code. Input to the OCC are two wires 13 which electrically connect from the output of an oil burner's 26 cad cell (or voltage reducer 210 for burners without cad cells 27). Electrical information in the form of 60 HZ pulses (50 HZ pulses for European models) from the cad cell 28, indicates when a flame is present. The OCC acts as an elapsed time clock which is enabled whenever the flame is on. An oil burner 27 not equipped with a cad cell, sends to the OCC a "burner on" signal from the oil burner's pump power switch 29. In this case the OCC measures burner pump motor on-time as opposed to flame on-time. With the use of a mathematical algorithm, the total flame on-time (or pump on-time) is converted to gallons consumed, which is displayed on a 5 digit counter 11. The OCC measures up to 999.99 or 9999.9 gallons (liters for European models).

Refer to FIG. 4. The OCC power supply inputs 120 or 220VAC, and outputs regulated +5 volts for electronic circuits, and unregulated +12 volts for the electromechanical counter 11. This power supply does not turn off with the oil burner, but remains constantly on to avoid any losses of time count information.

Refer to FIG. 5. FIG. 5A is a block diagram of the OCC's flame detector circuit, and FIG. 5B shows its output waveforms. A voltage waveform taken from the output of a typical oil burner cad cell during normal operation would contain 60 (50) HZ pulses that measured any one of the following three:

a. less than 50 millivolts peak, indicating that the burner was completely off 41;

b. greater than 50 millivolts, but less than 5 volts peak, indicating that the burner was on and a flame was present 42;

c. greater than 5 volts peak, indicating that the burner was running with no flame present 43.

The OCC's flame detector circuit 21 senses the presence of one of the three mentioned states with the use of voltage comparators 45, 46, and 47. When comparator 45 senses a voltage of less than 50 millivolts peak, its output to the pulse shaper 48 is zero, resulting in no detector 21 output. When comparator 45 senses a voltage greater than 50 millivolts peak, it outputs pulses to the shaper 48 at a 60 (50) HZ rate.

The combination of comparators 46 and 47 form an enable circuit. When comparator 46 senses a voltage greater than 5 volts peak, comparator 47 output is a fixed low (zero volts) which disables the pulse shaper 48. When comparator 46 senses a voltage less than 5 volts peak, comparator 47 output is a fixed high (five volts) enabling the shaper 48. As a result, the detector 21 outputs 60 (50) HZ squarewave pulses only when a voltage between 50 millivolts and 5 volts is sensed. This is the desired result since cad cell 28 voltage output in this range indicates flame-on. In the case where a burner does not utilize a cad cell 27, a voltage reducer 210 installed after the burner-on switch 29, outputs to the flame detector 21 a voltage within the flame-on range, thus enabling the detector 21 to output pulses during system activation.

Refer to FIG. 6. The OCC is able to convert a number of detector pulses 51 (a measure of time output from detector 21), to a number of index pulses 52 (a measure of consumption). An output of 60 (50 for European models) pulses from the detector 21 implies that the flame (or burner) was on for a total of one second, 3600 (3000) pulses implies a total of one minute, 216000 (180000) pulses implies one hour etc. Suppose a nozzle outputs fuel at a rate of 0.8 gallons per hour in a burner operating at 60 HZ. This means that after 1 hour, the counter 11 must read 000.80, i.e. it must receive 80 index pulses 52. The function of the Programmable Frequency Divider (PFD) 53 is to convert a measure of time to a measure of gallons. It simply outputs one pulse for every N pulses in. Thus for every 216000 pulses in (1 hour of elapsed time), it must output 80 index pulses 52, or one pulse for every 2700 pulses in. Hence the number "N" for this particular example is 2700 as can be seen from the following equations:

After 1 hour:

$$216000/2700 = 80 \longrightarrow 000.80 \longrightarrow .8$$
(pulses)  N  (pulses)  (reading)  (gallons)

For a 50 HZ system N must equal 2250.

After 1 hour:

-continued $$180000/2250 = 80 \longrightarrow 000.80 \longrightarrow .8$$
(pulses)  N  (pulses)  (reading)  (gallons)

The number N is programmed by the setting of the 16 dipswitches 23 shown. SW0 has a binary weight of $2^0$, SW1 a weight of $2^1$, SW2 a weight of $2^2$, etc. In the above example, the PFD 53 must output 1 pulse for every 2700. By setting the dipswitches 23 to 2700 in binary, the PFD 53 will output 1 index pulse 52 for the electro-mechanical counter 11 for every 2700 pulses 51 in.

The counter 11 requires approximately 100 milliamps of current to electromechanically increment its count. Therefore a current amplifier 54 is utilized to accommodate this requirement.

It is a known fact that nozzle flow rate is not just a function of nozzle aperture size, but also a function of delivery pump pressure. See FIG. 7. Nozzle flow rate=(nozzle number x square root(pump pressure))/10, where nozzle number is the number stamped on the nozzle itself, and pump pressure is measured in psi. By having N adjustable from 2 to $2^{16}$, the OCC is very versatile in that it can accommodate different AC power frequencies, nozzle sizes, counter display sizes (3,4,5, or 6 digit), as well as different pump pressures. Below are two examples illustrating the calculation of N which demonstrates this fact.

EXAMPLE 1

Calculation of OCC dipswitch setting given a nozzle number 1.2, pump pressure 140 psi, operating at 60 HZ and readout of 0 to 999.99 gallons.

nozzle flow rate = (1.2 × square root(140))/10 = 1.4198 gallons/hr
N = 2160/1.4198 = 1521.3410 = 1521 (to nearest integer)
dipswitch setting = 1521 (in binary)

EXAMPLE 2

Calculation of OCC dipswitch setting given a nozzle number 1.5, pump pressure 100 psi, operating at 50 HZ and readout of 0 to 9999.9 gallons.

nozzle flow rate = (1.5 × square root(100))/10 = 1.5 gallons/hr
N = 18000/1.5 = 12000.0 = 12000 (to nearest integer)
dipswitch setting = 12000 (in binary)

The OCC can be programmed to measure oil consumption simply by calculating N for any given nozzle size and pump pressure as illustrated above. The accuracy of the OCC is the same as a digital clock when measuring flame on-time. The OCC counts pulses of sixty cycles per second frequency sampled from the cad cell 28 as does a clock sample from its wall outlet. As a result, the Counter will not add errors to any of its calculations. Errors that exist in the OCC oil consumption calculation, will be due to an error in the specification of nozzle size or pump pressure, or a restriction in the fuel feed line.

CONCLUSION, RAMIFICATIONS, AND SCOPE

Thus the reader will see that the Oil Consumption Counter provides a reliable, economic, simply installed device that will allow home owners (or industry) to more accurately monitor fuel consumption. This capability will provide the user with the ability to monitor fuel consumption efficiently by recording fuel consumption versus outdoor temperature each day. Furthermore, the OCC has the following additional advantages:

utilizes low voltage for count stimulus thus allowing bell wires to be easily run in order to position counter in any convenient location;
detects a clogged or restricted fuel line to burner;
detects an inefficiently running heating system;
measures in gallons or liters;
operates at 120 or 220 volts and 50 or 60 cycles;
compensates for different oil pump pressures as well as nozzle sizes;
detects leaks in underground storage tanks;
very low energy consumption (less than 1 watt);
is constantly powered to avoid measurement errors;
utilizes burner's photo-optic cell to activate counting mechanism and thus avoiding false counts when fuel is not passing through pump during initial start-up;
resettable to a given number (decremental count) for measuring fuel remaining in a tank, as well as resettable to zero (incremental count) for measuring consumption.

I claim:

1. A meter for use in a fuel oil consumption metering system which includes (i) a burner having a nozzle with an aperture, a fuel pump, a predetermined fuel delivery rate, a burner-on indicator in the form of a flame, and a photocell located so as to detect the presence of said flame to produce an output signal for the duration in which said flame is detected, (ii) fuel supply means for supplying fuel to the burner at a predetermined constant rate corresponding to said fuel delivery rate, said burner being adapted to consume the delivered fuel at said constant rate, said supply means being selectively operated during at least one of a plurality of predetermined time periods corresponding to different stages of a single burner operation period, (iii) means to selectively couple a first power source to the supply means to effect the supplying operation thereof, and (iv) a fuel consumption digital display means, said meter comprising:

at least one voltage comparator responsive to said photocell output signal to provide a first output having a duration corresponding to the duration of said photocell output signal, and a second output otherwise;

a frequency divider programmed with system parameters including fuel pump pressure, nozzle aperture size, the number of digits in said digital display means, whether metric or customary units of measure are to be displayed by said display means, said predetermined fuel delivery rate, and the START and END times of each said plurality of predetermined time periods, said frequency divider being coupled to said at least one voltage comparator to measure the time during which said first output is present between the respective START and END times of each of said plurality of predetermined time periods, and to provide output data indicative of the total "first output" time for each of said plurality of predetermined time periods respectively; and register means for receiving the frequency divider output data and for registering data corresponding to the total "first output" time for each of said plurality of predetermined time periods, said register means being adapted to accumulate said frequency divider output data over a plurality of said burner operation periods so as to provide on said digital display means a cumulative registry indicative of the total "first output" time for each of said plurality of predetermined time periods.

2. A fuel oil consumption meter according to claim 1, wherein said at least one voltage comparator, said frequency divider and said register means are coupled to a second power source in a manner which is independent of the selective coupling of said first power source to said supply means.

3. A fuel oil consumption meter according to claim 1, wherein said first output is in the form of detector pulses, and wherein said frequency divider further comprises a divide-by-N counter, dip switches for programming said counter to increment one pulse per N detector pulses, and a reset button for resetting the counter, such that said counter converts "first output" time data into an amount of fuel consumed by said burner during each respective one of said plurality of time periods, said fuel amounts thereby constituting said frequency divider output data.

* * * * *